(12) United States Patent
Nüttgens et al.

(10) Patent No.: US 8,297,077 B2
(45) Date of Patent: Oct. 30, 2012

(54) METHOD AND DEVICE FOR THE CONTACTLESS TRANSPORT OR SUPPORT OF GLASS OR GLASS CERAMIC

(75) Inventors: Sybill Nüttgens, Frankfurt (DE); Ulrich Lange, Mainz (DE); Michael Clauss, Hofheim (DE); Andreas Langsdorf, Ingelheim (DE); Gerhard Hahn, Allenfeld (DE)

(73) Assignee: Schott AG (DE)

( * ) Notice: Subject to any disclaimer, the term of this patent is extended or adjusted under 35 U.S.C. 154(b) by 506 days.

(21) Appl. No.: 11/721,188

(22) PCT Filed: Dec. 9, 2005

(86) PCT No.: PCT/EP2005/013246
§ 371 (c)(1),
(2), (4) Date: Jan. 30, 2009

(87) PCT Pub. No.: WO2006/061244
PCT Pub. Date: Jun. 15, 2006

(65) Prior Publication Data
US 2009/0155024 A1      Jun. 18, 2009

(30) Foreign Application Priority Data

Dec. 11, 2004  (DE) .......................... 10 2004 059 727

(51) Int. Cl.
*C03B 18/08* (2006.01)
*C03B 21/02* (2006.01)

(52) U.S. Cl. .......... 65/182.2; 65/182.1; 65/148; 65/174; 406/70; 406/99; 406/104

(58) Field of Classification Search .................... 65/148, 65/182.1–182.2; 226/118.3, 90, 17
See application file for complete search history.

(56) References Cited

U.S. PATENT DOCUMENTS

| | | | | |
|---|---|---|---|---|
| 2,848,820 A | * | 8/1958 | Wallin et al. | 34/461 |
| 2,849,345 A | * | 8/1958 | Smith et al. | 100/55 |
| 3,526,491 A | | 9/1970 | Sharrock | |
| 3,829,352 A | * | 8/1974 | Wilde et al. | 428/38 |
| 4,804,081 A | | 2/1989 | Lenhardt | |
| 5,876,474 A | | 3/1999 | Maltby, Jr. et al. | |
| 6,192,711 B1 | | 2/2001 | Lisec | |
| 6,781,684 B1 | * | 8/2004 | Ekhoff | 356/237.1 |
| 2003/0037573 A1 | * | 2/2003 | Langsdorf et al. | 65/158 |
| 2003/0177790 A1 | * | 9/2003 | Langsdorf et al. | 65/25.2 |

FOREIGN PATENT DOCUMENTS

FR     1 497 264 A     10/1967
(Continued)

OTHER PUBLICATIONS

Ishikawa, Taro, "JP Application No. 2007-544834 Office Action Oct. 24, 2011", , Publisher: JPO, Published in: JP.

*Primary Examiner* — Matthew Daniels
*Assistant Examiner* — Jodi C Franklin
(74) *Attorney, Agent, or Firm* — Kaplan Breyer Schwarz & Ottesen, LLP (57) ABSTRACT

In order to provide a particularly homogeneous pressure and temperature profile in a gas cushion for the levitating support of glass or glass ceramic, the invention provides a device (19) for transporting or supporting glass ceramic or glass, which comprises at least one diaphragm (1, 2) that has at least one continuous bearing surface (3) and at least one gas feed chamber (51-55) and at least one gas discharge chamber (71-75), the gas feed chamber (51-55) and the gas discharge chamber (71-75) having a gas-permeable connection to the bearing surface (3).

3 Claims, 6 Drawing Sheets

FOREIGN PATENT DOCUMENTS

| | | |
|---|---|---|
| FR | 2 024 397 A | 8/1970 |
| GB | 1 308 632 A | 2/1973 |
| JP | H03-095020 A | 4/1991 |
| JP | H06-506182 A | 7/1994 |
| JP | H06-286831 A | 10/1994 |
| JP | 2004345744 A | 12/2004 |

* cited by examiner

METHOD AND DEVICE FOR THE CONTACTLESS TRANSPORT OR SUPPORT OF GLASS OR GLASS CERAMIC

The invention relates in general to the transport of bodies during a production process and, in particular, to the contactless transport and support of bodies made of glass on a gas cushion.

For the production of glass ceramic, a glass plate to be ceramized is conventionally placed on a support and transported together with the support through a ceramizing oven. Such ceramizing ovens are often designed as tube ovens, in order to allow an uninterrupted production process. Such tube ovens generally comprise various chambers, which are kept at different temperatures. When passing through the chambers of the oven, a plate to be ceramized is then exposed to a chronological temperature profile, in order to bring about the ceramization. The temperature of a glass plate during the ceramization lies between 750 and 950° C. The most favorable temperature profile for the ceramization depends in particular on the type of glass being used.

In order to achieve good ceramization, it is important for the temperature distribution on both sides of a glass plate to be as homogeneous as possible, especially in the region of the nucleation temperature.

In the region in which nucleation occurs in the glass ceramic, viscosities in the range of from $ç=10^{10}$ to $10^9$ dPs are reached. The glass temporarily becomes very soft during the ceramization process, inter alia because of the release of heat which takes place during the crystallization. The surface of the support, on which the glass to be ceramized rests, is correspondingly replicated in particular on the resting side of the glass. The surface of the support should therefore not influence the glass surface as far as possible. The glass plate also must not adhere to the support since otherwise, during separation, damage to the glass surface may also take place because of different expansion coefficients of the glass and the support when heating and cooling. This damage is detrimental in particular for the stability of the ceramized product.

Ground ceramic plates with a smooth surface are often used as supports. Powders are also scattered between the support and the glass plate as a separating agent in order to prevent adhesion, and thus likewise ensure that damage to the glass surface does not take place. Both ground ceramic plates and powders, however, generally cannot entirely avoided damage to the glass surface. Such supports, on the other hand, present the advantage that they have a large heat capacity and thus ensure a very uniform temperature distribution and compensate for temperature variations on the resting surface of the glass plate. The large heat capacity is also disadvantageous when ceramizing programs with rapid temperature changes are intended to be carried out during the ceramization process. The support plate also needs to be co-heated during the ceramization process for each glass plate, which leads to considerable energy losses.

GB 1383202 discloses a method for the contactless support of glass ceramics during ceramization. The support used to this end is a perforated plate, through which gas flows so that a gas cushion is formed between the support and the glass plate. The gas delivered through the perforated support flows between the plate and the support to the edge of the plate, where it finally escapes. The effect of this arrangement, however, is that only comparatively small glass plates can be ceramized. For large glass plates, the inhomogeneous pressure distribution created in the gas cushion below the glass plate leads to an often unacceptable curvature of the plate.

DE 10045479 discloses a method for the contactless support and transport of flat glass, which likewise involves support on a gas cushion. To this end the support has a segmented structure, in which the gas is supplied through openings in the segments and can escape again through the gaps between the segments. The temperature distribution over the glass plate, however, is difficult to regulate in a segmented system. In order to achieve good temperature homogeneity, the segments must be arranged very close together. Then, however, a stagnation pressure can again form which may have repercussions on the planarity of the glass plate.

For prestressing glass, it is furthermore known from U.S. Pat. No. 4,059,426 to use arrangements in which flat glass to be prestressed is likewise supported and transported on a gas film. A diaphragm is used as the support in this case, which has feed and discharge air perforation. The discharge air channels pass through the diaphragm, so that the discharged air emerges on the opposite side of the bearing surface for the flat glass. Viscosities in the range of from $ç=10^{12}$ to $10^{11}$ dPs are reached during the prestressing. Compared with ceramization, at much lower viscosities, the requirements for the homogeneity of the pressure distribution are therefore less.

U.S. Pat. No. 5,078,775 describes a gas cushion support with a diaphragm, the upper side of which has slotted gas feed and gas outlet openings. The gas outlet openings are in communication with gas outlet chambers in the diaphragm. The gas feed openings are connected via manifold shafts to the lower side of the diaphragm. On the lower side of the diaphragm, compressed gas is supplied which flows through the manifold shafts and the gas feed openings to the upper side, where it generates a gas cushion on which a glass plate can then be supported. With such an arrangement in which the feed gas is supplied perpendicularly to the upper side, however, the gas comes only comparatively briefly in contact with the walls of the manifold containers, so that full heat exchange does not take place and the gas can therefore flow into the gas cushion at a temperature which may differ from the temperature of the diaphragm and in particular the temperature of the supported glass.

For the contactless transport and/or support of glass or glass ceramic, it is an object of the invention to provide support on a gas cushion with a particularly homogeneous pressure and temperature distribution.

A device according to the invention for transporting and/or supporting glass ceramic or glass accordingly comprises at least one diaphragm as a support, which has at least one continuous bearing surface, at least one gas feed chamber and at least one gas discharge chamber, the gas feed chamber and the gas discharge chamber having a gas-permeable connection to the bearing surface of the diaphragm.

Accordingly, the method according to the invention for transporting and supporting glass ceramic or glass, which may in particular be carried out by means of a device according to the invention, provides that the glass or the glass ceramic is supported while resting on a gas cushion generated over a continuous bearing surface of a diaphragm, wherein levitation gas is supplied to the gas cushion via at least one gas feed chamber arranged in the diaphragm and connected to the bearing surface by a gas-carrying connection, and wherein levitation gas of the gas cushion is at least partially discharged again via at least one gas discharge chamber arranged in the diaphragm and connected to the bearing surface by a gas-carrying connection. The chambers and the gas-permeable connections are furthermore preferably dimensioned so that no pressure drop takes place in the chambers along the gas flow direction, i.e. a virtually homogeneous pressure prevails.

Thus, in contrast to the device disclosed in U.S. Pat. No. 5,078,775 in which the gas feed takes place via manifold shafts through the diaphragm, according to the invention the gas supplied to the gas cushion is delivered through one or more chambers arranged in the diaphragm, before it emerges from the diaphragm. In this way, in conjunction with the gas discharge chamber or chambers, not only a particularly homogeneous pressure distribution but also good temperature equilibration achieved. Owing to the residence time of the gas in the gas feed chamber, its temperature is brought closer to the temperature of the diaphragm and of the supported glass plate or glass ceramic plate. The arrangement and procedure according to the invention for supporting the glass or the glass ceramic helps to achieve a very uniform temperature distribution along the supported plate. This also leads in a surprisingly simple way to an increased strength of glass ceramic plates which are supported according to the invention during the ceramization.

For effective heat transfer between the levitation gas flowing out of the diaphragm and that flowing into it, it is advantageous for the at least one gas feed chamber and at least one gas discharge chamber to comprise closed channels, which extend in the direction along the bearing surface inside the diaphragm. The term closed channel is accordingly intended to mean a channel which is bounded by a wall in the manner of a tube. The channels may in particular be configured so that they are closed or at least partially closed from the bottom surface of the diaphragm, which lies opposite the bearing surface, or are bounded at least partially at the bottom by a wall. A closed channel in the context of the invention does not mean a fully sealed cavity, however, since at least one inlet opening for the gas feed chamber and one outlet opening for the gas discharge chamber are provided for the feed and discharge from the chambers or respectively to the chambers of this embodiment.

The gas feed chamber may advantageously have a gas inlet opening and the gas discharge chamber a gas outlet opening, which are arranged so that the gas flow direction inside the gas feed chamber and the gas discharge chamber extends transversely to the normal of the bearing surface, and in particular along the bearing surface. If the levitation gas in the gas feed chamber and the gas discharge chamber in the diaphragm flows transversely to the normal of the bearing surface, particularly in the direction along the bearing surface, then a long flow path of the gas in the chambers and concomitantly also effective heat transfer to the chamber walls can be achieved even in a thin diaphragm.

According to one embodiment of the invention, the levitation gas is fed into the gas feed chamber through at least one gas-permeable connection on the lower side of the diaphragm. An antechamber, preferably with a ceramic wall, arranged below the gas feed and gas discharge chambers, may then be provided which is connected via at least one gas-permeable connection to the gas feed chamber in order to feed gas into the gas feed chamber. It would also be conceivable for the antechamber itself to be a component of the diaphragm, or to use an integral diaphragm having at least one antechamber, gas feed chamber and gas discharge chamber. In each case, the gas feed chamber is at least partially closed at the bottom, the levitation gas being introduced into the gas feed chamber by a downwardly directed gas-permeable connection in the diaphragm into the gas feed chamber. Although the gas is also supplied from below, for example in the gas cushion support known from U.S. Pat. No. 5,078,775, this diaphragm does not however have chambers or channels for the gas feed which are closed or at least partially closed at the bottom. Rather, the channels are entirely open at the bottom. In contrast to this, the effect achieved by the gas feed chamber with a gas-permeable connection, particularly in the form of channels with a small cross section as the gas feed chamber, is that the gas resides for a longer time in the gas feed chamber before it emerges from the bearing surface via the further gas-permeable connection. In this embodiment of the invention as well, improved heat exchange with the diaphragm and therefore particularly good temperature homogeneity in the gas cushion are therefore achieved. In particular, with a device according to the invention, the temperature of the levitation cushion can be kept with a temperature gradient of less than 10° C., preferably less than 5° C. in the direction along the bearing surface by means of the diaphragm with chambers for gas feed and gas discharge. Likewise conceivable, albeit somewhat more elaborate, is a reversed configuration in which it is not the gas feed chambers but the gas discharge chambers that are correspondingly attached to an antechamber by means of a downwardly directed gas-permeable connection, so that the gas from the levitation cushion travels via the gas discharge chambers into the antechamber and is discharged there.

The chambers are preferably designed so that the pressure drop is at most 0.5 mbar with the intended gas pressure in the chambers. If the levitation gas experiences a pressure drop of at most 0.5 mbar when flowing through the gas feed chamber and/or the gas discharge chamber, then a particularly homogeneous pressure distribution can also be achieved in the gas cushion.

According to the invention, by applying gas to the gas feed chamber, a gas cushion is generated between the bearing surface and a body of glass or glass ceramic supported thereon, on which the body can then be held in levitation free from contact with the diaphragm, pressure equilibration in the gas cushion being established through the gas-conducting connection of the continuous bearing surface to the at least one gas discharge chamber. A particularly homogeneous pressure distribution is thus achieved by the invention. Owing to these properties of the device according to the invention and the method according to the invention, they are also particularly suitable for ceramizing glasses. According to one embodiment of the invention, the device therefore comprises in particular a ceramizing oven. Correspondingly, one embodiment of the method also comprises the ceramization of material supported on the gas cushion, in particular the ceramization of glass. A method for ceramizing glass which can be carried out with the device according to the invention, as well as glass ceramic articles producible with the device according to the invention or the method according to the invention described here are also described in the Applicant's German application filed on the same day as the present invention with the title "Method for Producing Glass or Glass Ceramic and in particular Glass or Glass Ceramic Articles", the disclosure of which is also fully incorporated in the subject-matter of the present invention.

Since, besides support, contactless transport in particular even of greatly softened material is also facilitated with the device according to the invention and the method according to the invention, the invention is also suitable for a continuous production process in which, for example, a continuous glass or glass ceramic web is processed. Accordingly, one embodiment of the device according to the invention comprises a tube oven. Correspondingly, one variant of the method according to the invention also provides the transport of a continuous glass or glass ceramic web or strip, the web or the strip resting on a gas cushion generated according to the invention at least in a section of the transport path.

The chambers arranged in the diaphragm also provide temperature equilibration between the temperature of the diaphragm and the levitation gas, since the gas in the chamber can be adapted to the diaphragm temperature before emerging through the conductive connection to the bearing surface.

The gas feed and gas discharge for the gas cushion may, for example, be adjusted by setting up a suitable pressure gradient between the gas feed and gas discharge chambers.

For ceramizing glass, it has proven advantageous for the mechanical properties and the thermal stability of the finally ceramized material that the glass is first heated to a temperature T1 in a range of from 650 to 800° C. and then kept at this temperature for a duration of from 0.5 to 4 hours. The glass may then be heated further to a temperature T2 in a range of from 850 to 950° C. and kept at this temperature T2 for a duration of about 5 to 50 minutes. Lastly, the now ceramized material may be cooled to room temperature. Holding at a temperature T1 serves for the nucleation of crystallization seeds, and holding at the temperature T2 serves for the crystal growth. These method steps may particularly advantageously be carried out while the material is supported on the gas cushion.

According to one embodiment of the invention, the diaphragm is made from extruded material. Extruded diaphragms can readily be produced in high quality with extruded gas feed and gas discharge chambers integrated in the diaphragm. Cordierite ceramic or sintered silicon oxide, or silicon oxide ceramic, is preferably used as a material for the diaphragm.

A diaphragm of this type with gas feed and gas discharge chambers can also comprise two suitably formed half-shells placed onto one another. These can be, for example, cast or likewise extruded. Cordierite ceramic or sintered silicon oxide can be used here too as materials.

In another preferred embodiment of the device according to the invention, the gas-permeable connection comprises channels which are connected to the bearing surface, in which case the channels may in particular also be arranged offset perpendicularly to a transport direction for the glass or the glass ceramic.

With a suitable configuration of the chambers, the gas which is introduced into the extruded chambers first experiences temperature equilibration in the gas feed chamber, before it reaches the bearing surface through the gas-conducting connection. In this way, besides a homogeneous pressure distribution, a very homogeneous temperature distribution is furthermore provided in the gas cushion and therefore on the resting side of the glass or the glass ceramic.

The at least one gas feed chamber and the at least one gas discharge chamber may advantageously have a shape elongated along a direction, in particular along the extrusion direction, and extend mutually parallel along this direction. This elongated shape of the chambers will additionally promote temperature equilibration. Such a shape of the chambers may, in particular, also readily be generated in a diaphragm produced by extrusion.

In this arrangement, it is advantageous for the gas-permeable connection to comprise connecting channels, which are connected to the bearing surface and which are arranged in one or more rows along the direction along which the chambers are elongated. A plurality of parallel-extending rows of channels are suitable in particular for the gas feed. In order to minimize the outlay for perforation, a single row of connecting channels to a gas discharge chamber may for example be provided for the gas discharge.

In the case of elongated chambers, it is furthermore advantageous for the diaphragm to be arranged so that the direction, along which the chambers have an elongated shape, essentially extends perpendicularly to the transport direction for glass or glass ceramic.

Particularly in order to achieve a maximally homogeneous pressure and temperature distribution in a straightforward way, the diaphragm of a device according to the invention may advantageously have a multiplicity of gas feed chambers and a multiplicity of gas discharge chambers, which are arranged alternately along a direction. In this embodiment, the diaphragm is preferably arranged so that the chambers are arranged alternately along the transport direction.

Inhomogeneities remaining in the pressure and/or temperature distribution may also advantageously be substantially averaged out over time by moving the substrate. This may also readily be achieved with reverser operation, in which the glass or the glass ceramic are moved to and fro along at least one direction along the surface of the bearing surface while resting on the gas cushion, in particular during ceramization.

For the embodiment of the invention described above, in which the gas feed chambers and gas discharge chambers are arranged alternately along a direction in the diaphragm, it is also particularly advantageous for the glass or the glass ceramic to be moved to and fro along this direction, with an excursion which is at least as great as the period of the alternating arrangement. The effect achieved by this is that essentially every position on the glass or the glass ceramic sweeps over both gas feed regions and gas discharge regions. By the periodic movement to and fro, the pressure acting on this position is thus averaged out over time and brought closer to the average pressure of the gas cushion.

If the gas feed chambers and gas discharge chambers have connecting channels to the bearing surface, which are arranged offset perpendicularly to the direction along which the chambers are arranged alternately, then the movement to and fro may be carried out with an excursion which is at least as great as the offset period of the connecting channels. In this way, particularly good averaging out of inhomogeneities in the pressure and/or temperature profile is achieved over time.

According to another embodiment of the device, the gas-permeable connection may comprise a porous material. To this end, for example, the extruded diaphragm may also be entirely made from porous material, for instance porous quartzal ceramic. The other side of the diaphragm from the bearing surface may then be provided with a sealing coat or covering, so that the gas flows only between the chambers and the bearing surface.

The device according to the invention may advantageously also comprise a gas purification device, by which the levitation gas is purified in order to avoid precipitation of contaminants.

According to one embodiment of the device according to the invention, the device has at least one mechanical rolling bearing for supporting and for transporting the glass ceramic material or glass material. Such a rolling bearing may for example comprise balls or rollers, on which the glass plate is supported.

On the rolling bearing, the glass material or glass ceramic material can be moved along the bearing surface of the diaphragm without friction contact taking place with the bearing surface, which could entail scratches and damage in the material. This is advantageous inter alia when the gas feed for the gas cushion is not operated, or does not need to be operated, when sliding the material onto the bearing surface or during the further transport. Such an embodiment of the device according to the invention is also advantageous in particular when strongly curved glasses or glass ceramics are intended to be transported. Compared with the levitational support and movement of bodies with plane surfaces, such as float glass plates, large amounts of gases are required for the levitation of such bodies. Here, for example, the glass cushion may be used only for support during the ceramization in order to increase the economic viability of the production process. Such a rolling bearing is also advantageous as a backup device, for example in case the gas feed fails.

The rolling bearing may be supported mechanically, for example in turn by suitable ball bearings. In particular, however, a gas-supported rolling bearing is also advantageous. This, like the bearing surface, may for example also be connected to a gas feed chamber via connecting channels, so that the roller or ball of the bearing is supported on a gas cushion.

If the glass or the glass ceramic is supported by the gas film, or the gas cushion, then resting on the rolling bearing is no longer necessary or is even undesirable, because this perturbs a homogeneous force distribution on the resting side of the glass or the glass ceramic.

It is therefore advantageous for the rolling bearing to be sunk into the bearing surface and thus not protrude entirely out of the bearing surface. In one embodiment of the device, therefore, the rolling bearing protrudes out of the bearing surface by at most half the floating height of the glass or glass ceramic.

The device according to the invention may advantageously comprise a heating device for processing glass or glass ceramic. Particularly for processing high-grade products made of glass or glass ceramic, an electrical heater such as one or more infrared radiators is advantageous, since this avoids contamination which may for example be formed as combustion products when using fossil burners.

Furthermore, advantageously, a first gas distribution chamber may be connected to the gas feed chamber on a first edge of the diaphragm, and a second gas distribution chamber may be connected to the gas discharge chamber on a second edge of the diaphragm, opposite the first edge. In this way, the gas feed and the gas discharge from and to the diaphragm take place on opposite edges of the diaphragm. A plurality of chambers are in this case preferably supplied by a gas distribution chamber. This structure is particularly simple and space-saving to produce.

It is furthermore advantageous for the levitation gas to be at least partially recirculated. To this end, the levitation gas may be supplied via the gas discharge chamber to a gas recirculation device which feeds the gas back to the gas feed chambers, from where it enters the gas cushion again. In this way, a circuit of the levitation gas is achieved. This is advantageous particularly when the glass or the glass ceramic is supported in the hot state on the gas cushion, for example for ceramization. The recirculated gas is thus already heated when it enters the gas feed chambers, so that the diaphragm is cooled only little by the newly supplied levitation gas. This on the one hand saves energy, and on the other hand the homogeneity of the temperature distribution is perturbed little or not at all.

According to one embodiment of the method according to the invention, glasses or glass ceramics with a bent or curved surface can also be produced. To this end, the diaphragm may have a curved bearing surface. A glass or glass ceramic body in the heated state may then be curved over the diaphragm by gravitational sinking. In this case, it is advantageous particularly for the levitation gas to be supplied during the curving process, so that the curving can take place contact-free. Diaphragms with a curved bearing surface may nevertheless also be used advantageously for the levitational transport and/or levitational support of already curved glasses or glass ceramics on a gas cushion.

The invention will be described in more detail below with reference to the appended figures. Parts which are the same and similar are provided with the same references in the figures.

Figure 1A:
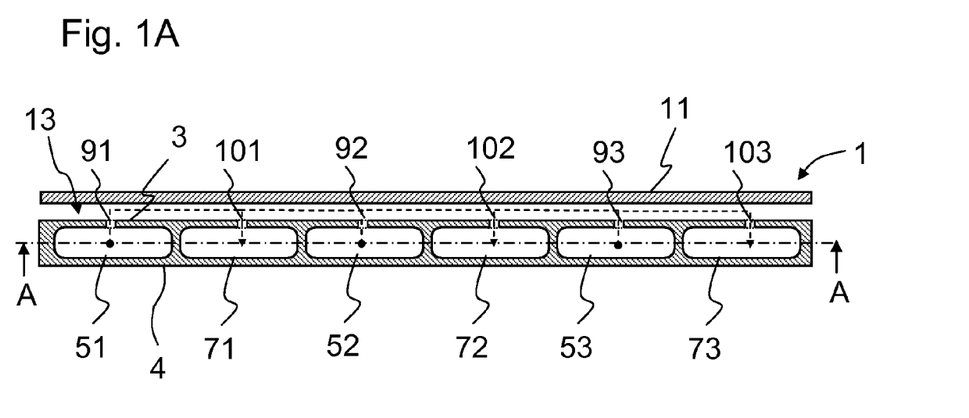
FIG. 1A shows a cross-sectional view through a diaphragm of a device according to the invention.

FIG. 1A represents a cross-sectional view of a diaphragm denoted overall by 1. The diaphragm is preferably produced by extruding a suitable material, such as a refractory ceramic. Inter alia, cordierite or sintered silicon oxide is suitable as the ceramic.

The diaphragm 1 has a number of chambers 51, 52, 53, 71, 72, 73, which are arranged inside the diaphragm below the continuous bearing surface 3 arranged on one side of the diaphragm. The chambers 51, 52, 53 in a device according to the invention are used as gas feed chambers and the chambers 71, 72, 73 are used as gas discharge chambers for the levitation gas of the gas cushion, which is formed between a glass or a glass ceramic lying thereon and the continuous bearing surface 3 of the diaphragm by supplying the levitation gas via the chambers 51, 52, 53. For illustration, FIG. 1A shows a glass or glass ceramic body 11, lying in levitation on a gas cushion or gas film 13 above the surface region 3, in the form of a plate which is plane on both sides. If the diaphragm is produced by extrusion, then the extrusion direction preferably lies in the direction perpendicular to the plane of the paper in FIG. 1. The gas feed chambers 51, 52, 53 and the gas discharge chambers 71, 73 therefore have a shaped elongated along this direction, and extend mutually parallel along this direction. In particular, the chambers are formed as a closed channels which extend in the direction along the bearing surface inside the diaphragm 3. The channels are also closed or at least partially closed from the bottom surface 4 of the diaphragm 1, which lies opposite the bearing surface 3, so that there is a thermal barrier to the lower side of the diaphragm 1.

Figure 1B:
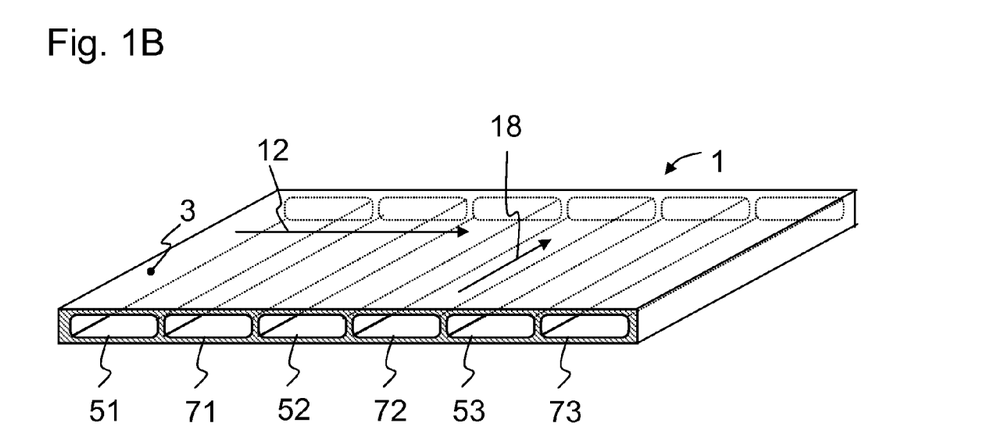
FIG. 1B shows a perspective view of the diaphragm represented in FIG. 1A.

The arrangement of the chambers is further illustrated with the aid of the perspective view represented in FIG. 1B. The extrusion direction 18 is indicated by an arrow. Particularly good equilibration of the gas temperatures can be provided by this shape and arrangement of the chambers, since supplied and discharged gas in the chambers flow mutually parallel in elongated channel-shaped chambers with a large surface. Preferably, the chambers are furthermore elongated along the direction perpendicular to the transport direction 12, so that they extend transversely to this transport direction. In this way, a position on the surface of a glass or glass ceramic body passes alternately over gas feed and gas discharge chambers. This prevents certain positions on the surface of a body to be transported from lying only or predominantly over gas feed or gas discharge chambers during the transport. In the case of an extruded diaphragm, the extrusion direction 18 is thus preferably perpendicular to the transport direction. The gas feed chambers 51-53 and the gas discharge chambers 71-73 are furthermore arranged alternately along the transport direction.

The glass or the glass ceramic 11 may also be moved along a direction along the surface of the bearing surface 3 while resting on the gas cushion 13. The direction along which the chambers are alternately arranged is preferably used for this, i.e. along the transport direction in the embodiment shown in FIGS. 1A and 1B. Such reverser operation is advantageous, particularly during ceramization in order to achieve a high planarity of the finally ceramized body, since remaining pressure or temperature inhomogeneities are averaged out over time. The glass or the glass ceramic 11 is particularly preferably moved to and fro along this direction, with an excursion which is at least as great as the period of the alternating arrangement of the gas feed and gas discharge chambers 51-53 and 71 to 73, respectively.

The effect achieved by the alternating arrangement of the chambers is that the gas feed regions and gas discharge regions on the bearing surface remain small, and a particularly homogeneous pressure distribution is therefore achieved since long flow paths of the levitation gas in the gas cushion are avoided along the bearing surface 3.

Figure 1C:
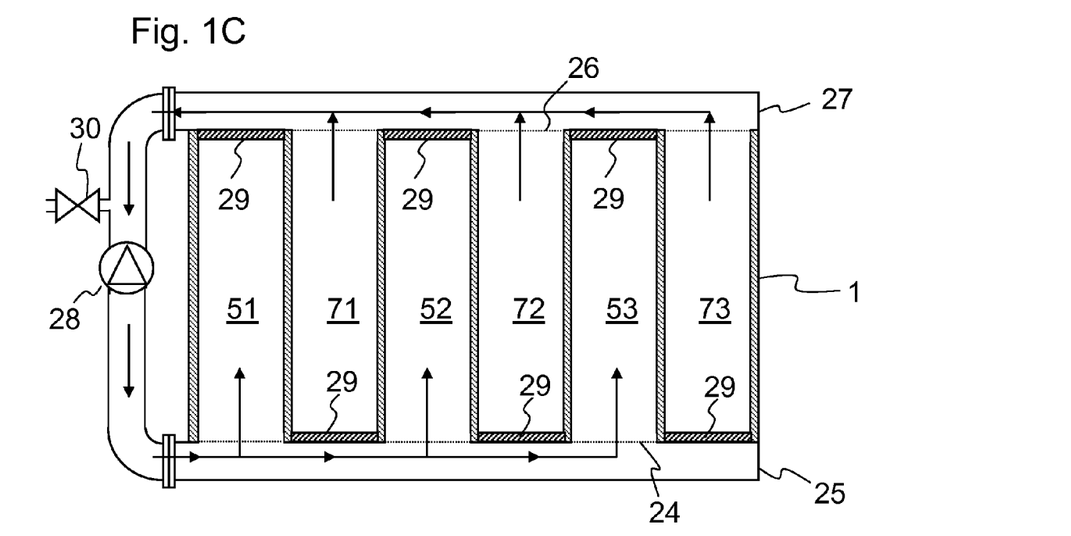
FIG. 1C shows a cross-sectional view of an embodiment of a diaphragm with an air circulation system connected to it.

FIG. 1C shows a cross-sectional view of an embodiment of a diaphragm with an air circulation system which comprises gas distribution chambers 25, 27 attached to the diaphragm 1, the cross section through the diaphragm 1 in plan view along the cross-section line A-A in FIG. 1A being represented.

The gas distribution chambers 25 and 27 are attached to the diaphragm on opposite edges 24 and 26, respectively. The gas feed chambers 51, 52, 53 are in communication with the gas distribution chamber 25 and the gas discharge chambers 71, 72, 73 are in communication with the gas distribution chamber 27, through openings 31, 32 of the chambers on the diaphragm edges 24, 26. In order to prevent connection of the gas discharge chambers 71, 72, 73 to the first gas distribution chamber 25 and connection of the gas feed chambers 51, 52, 53 to the second gas distribution chambers 27, closure parts 29 are fitted into the openings of these chambers in the diaphragm edges. In this way, the levitation gas travels from the first gas distribution chamber 25 via the diaphragm edge 24 into the gas feed chambers 51, 52, 53, and levitation gas discharged from the gas cushion travels from the gas discharge chambers 71, 72, 73 via openings on the opposite diaphragm edge 26 into the second gas distribution chamber 27. The effect achieved owing to the arrangement of the openings 31, 32 on the diaphragm edges, serving respectively as gas inlet and gas outlet openings of the chambers 51, 52, 53, 71, 72, 73, is that the gas flow direction inside the chambers 51-53, 71-73 extends transversely to the normal of the bearing surface, in particular along this surface.

The bearing surface 3 is perforated and, as perforation, has gas feed channels 91, 92, 93 and gas discharge channels 101, 102, 103 as a gas-conducting connection between the chambers and the bearing surface 3. The levitation gas is supplied and discharged via the gas feed channels 91, 92, 93 and gas discharge channels 101, 102, 103, which are in communication with the bearing surface 3 and the chambers 51, 52, 53 and 71, 72, 73. The gas flow direction is represented by arrows in FIG. 1C. To this end, a pressure difference is generated between the chambers 51, 52, 53 and 71, 72, 73, a higher pressure being set up in the gas feed chambers 51, 52, 53 than in the gas discharge chambers 71, 72, 73.

For example, a glass or glass ceramic body may then be electrically heated in order to ceramize or further process it. Electrical heating substantially avoids contamination of the glass or the glass ceramic.

Using a gas purification device (not shown), the levitation gas may also be purified before entering the gas feed chambers, for example so that it is substantially free of suspended particles which may deposit on the surface of the initial glass body when it is in the softened state.

Using a pump 28 as a gas recirculation device, which is attached to the gas distribution chambers 25 and 27, the levitation gas is furthermore recirculated so as to produce a gas circuit corresponding to recirculated air operation. The levitation gas which has entered the gas discharge chambers 71 from the gas cushion is taken in by the pump and thus fed back to the gas feed chambers 51 to 53, from where it is again enters the gas cushion. It is then merely necessary to replace gas escaping laterally between the glass or glass ceramic and the support, for example by creating a defined leak by means of a leak valve 30 on the negative pressure side of the pump 28, as shown in FIG. 1C. In this way, the temperature compensation to be carried out in the chambers of the diaphragm is reduced to a minimum, when the gas is recycled in the hot state. A temperature difference between the gas cushion and the surface of the material resting on the gas cushion is thus reduced further.

By means of the pump, a pressure difference is furthermore generated between the gas feed and gas discharge chambers, in order to generate a gas flow from the gas feed chambers 51 to 53 into the gas cushion and from there into the gas discharge chambers 71 to 73. Inside the chambers 51-53, 71-73, the pressure difference along the gas flow direction may on the other hand be kept as small as possible. According to a refinement of the method according to the invention, the levitation gas experiences a pressure drop of at most 0.5 mbar when flowing through the gas feed chamber 51-53 or the gas discharge chamber 71-73. A more uniform gas flow can therefore be achieved along the chambers, out and into the gas cushion, without for instance the dimensioning of the gas feed and gas discharge channels needing to be adapted in order to achieve a homogeneous pressure distribution.

Figure 1D:
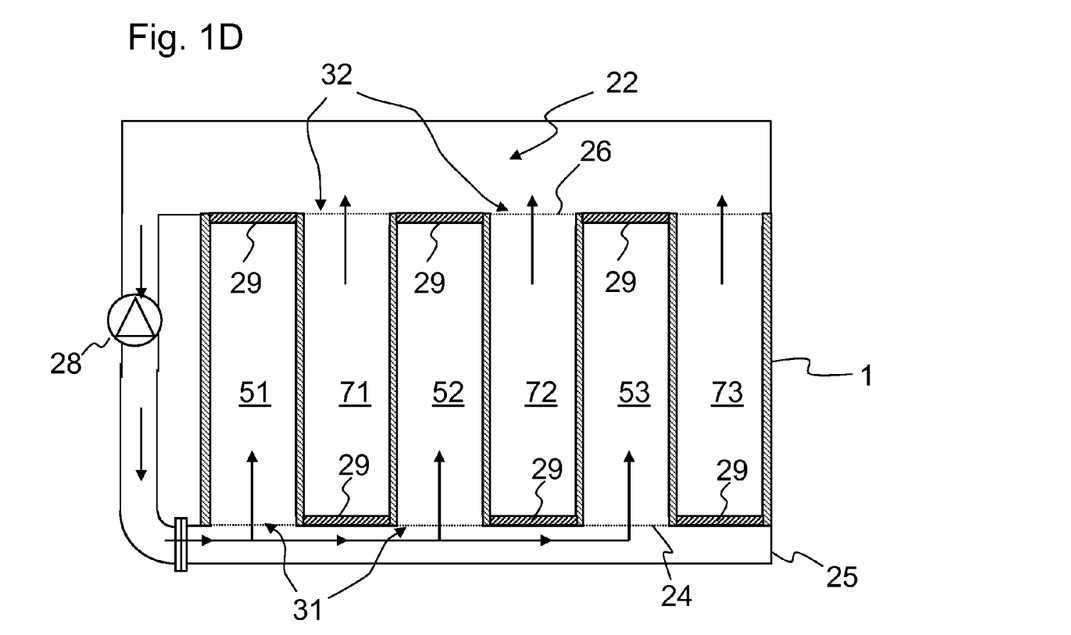
FIG. 1D shows a cross-sectional view of another embodiment of a diaphragm with gas distribution chamber connected to it.

FIG. 1D represents another embodiment of the diaphragm 1 with a gas supply in the form of an air circulation system for the levitation gas. In contrast to the embodiment shown with the aid of FIG. 1C, the gas flowing from the bearing surface into the gas discharge chambers 71 to 73 is not fed via a gas distribution chamber to the pump 28, rather the gas discharge chambers 71 to 73 are open in the direction of a schematically represented oven space 22. In the oven space 22 the bearing surface 3 is also arranged, the glass being supported on the diaphragm 1 in the oven space 22. From the oven space, the levitation gas is also taken in again by the pump and fed to the gas cushion on the airing surface 3 via the gas distribution chamber 25 and the gas feed chambers 51-53 of the diaphragm 1.

Figure 1E:
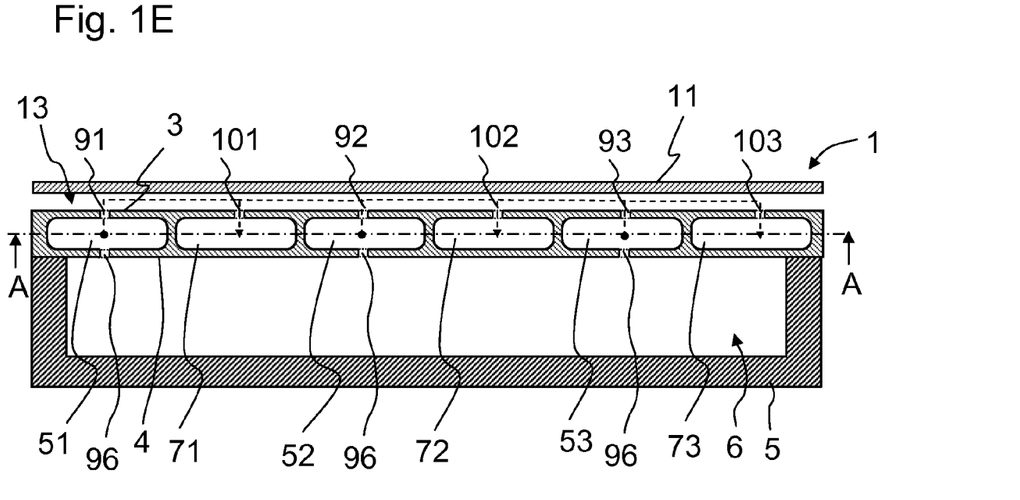
FIG. 1E shows an embodiment of the invention with an antechamber arranged below the diaphragm for supplying the levitation gas to the diaphragm.

FIG. 1E represents a refinement of the invention, in which the gas is introduced into the gas feed chambers via an antechamber 6 arranged below the diaphragm 1. In this refinement of the invention as well, the gas feed chambers 51, 52, 53 are bounded at least partially at the bottom by a wall of the diaphragm 1. The gas feed chambers 51, 52, 53 respectively have downwardly directed gas-permeable connections in the form of channels 96 on the lower side or bottom surface 4, for supplying gas from the antechamber 6. The antechamber 6 is formed by an antechamber housing 5 attached to the bottom surface 4. The antechamber housing 5 is preferably made from ceramic material like the diaphragm 1, in order to avoid contamination of the levitation gas.

By means of the diaphragm according to the invention, as has been described by way of example with the aid of FIGS. 1A to 1E, the glass or the glass ceramic (11) is kept by the levitation cushion at a height of at least 750 micrometers, preferably up to at most 2 millimeters, above the bearing surface.

Figure 2:
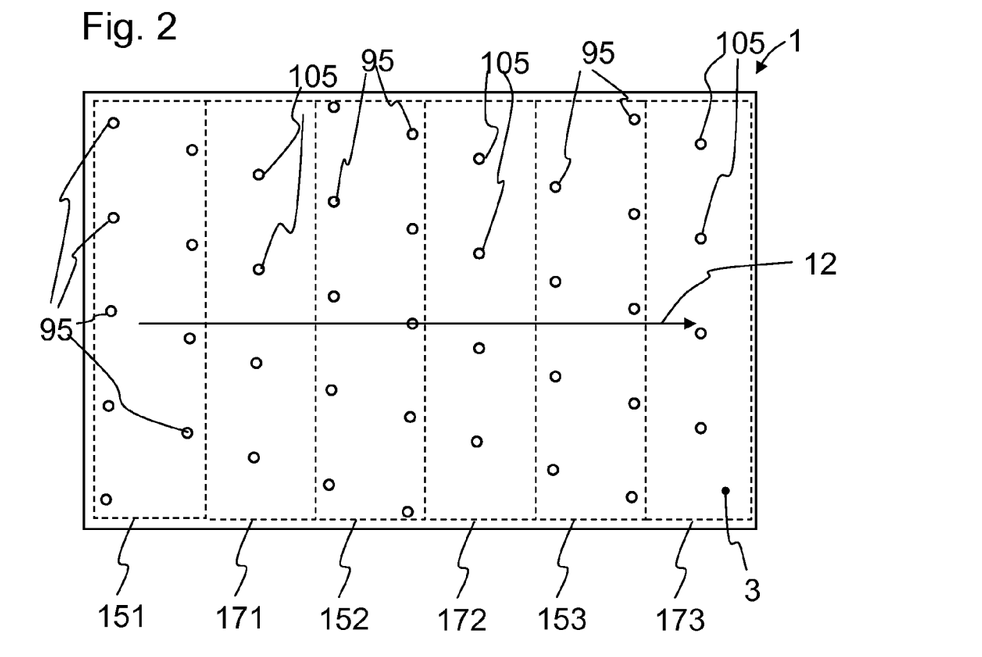
FIG. 2 shows a plan view of an embodiment of the diaphragm.

FIG. 2 shows a plan view of the continuous surface of one embodiment of a levitation support 1 in the form of a diaphragm. The surface region 3 of the levitation support 1 has gas feed regions 151, 152, 153 at which levitation gas for the gas cushion is supplied, and gas discharge regions 171, 172, 173 at which gas from the gas cushion is at least partially discharged. The regions 151, 152, 153, 171, 172, 173 are marked by the dashed lines in FIG. 2. The gas is supplied via gas feed channels 95 arranged in the gas feed regions 151, 152, 153, and the gas is discharged via gas discharge channels 105 arranged in the gas discharge regions. For the sake of clarity, only a few of the channels 95 and 105 are labeled in FIG. 2. As represented in FIG. 1, the channels 95 and 105 are connected to chambers arranged below the surface region 3.

The channels 95 and 105 are furthermore arranged offset perpendicularly to the transport direction 12, indicated by an arrow, for the glass or the glass ceramic. This prevents certain positions of a glass or glass ceramic body from lying more frequently over openings of channels during the levitating transport on the gas cushion. Pressure differences still existing in the pressure cushion, which become noticeable particularly in the vicinity of the channels, are thereby averaged out over time in the course of the levitating transport and in the reverser operation.

In general, particularly with a large number of channels and chambers along the transport direction 12, periodic repetition of the pattern of the connecting channels will take place. In this case, it may be advantageous for the reverser operation that the movement of the glass or the glass ceramic to and fro should take place with an excursion which is at least as great as the offset period of the connecting channels 95, 105, or the repetition period of the pattern of the connecting channels.

Figure 3:
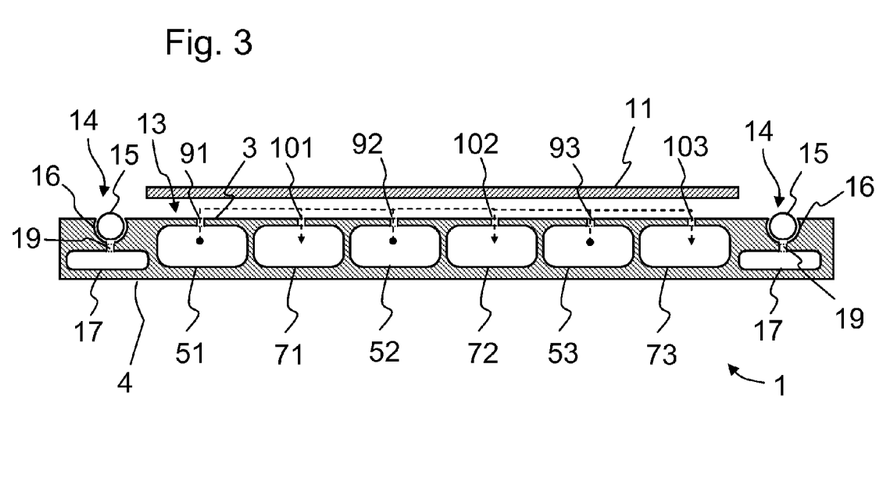
FIG. 3 shows a cross-sectional view through another embodiment of a diaphragm of the device according to the invention with gas-supported rolling bearings.

FIG. 3 represents a cross-sectional view of another embodiment of a diaphragm 1. In contrast to the embodiment represented in FIG. 1, the diaphragm has two rolling bearings 14. The rolling bearings respectively comprise a roller bearing 15, which is sunk into the diaphragm 1. To this end, the roller bearing 15 is guided in running bushes 16 which are sunk into the bearing surface 3 of the diaphragm 1, so that only a part of the roller bearing 15 protrudes from the bearing surface 3.

The rolling bearings 14 of this embodiment of the diaphragm 1 are furthermore gas-supported. To this end, the diaphragm 1 additionally comprises gas feed chambers 17 which are in communication with the running bushes 16 via channels 19. When gas is applied to the gas feed chambers 17, then the gas travels through the channels 19 into the running bushes 16 where an air cushion, on which the roller bearings levitate, is formed between the running bushes and the roller bearings 15. For the transport of glass or glass ceramic bodies, for example, gas may be applied only to the chambers 17.

Once a body has reached its intended position for the levitational support, then a gas cushion may be generated between the bearing surface 3 and the body via the gas feed chambers 51 to 53 and the gas discharge chambers 71 to 73. The gas cushion may then be switched off again in order to transport the body further on the gas-supported rolling bearings.

Figure 4:
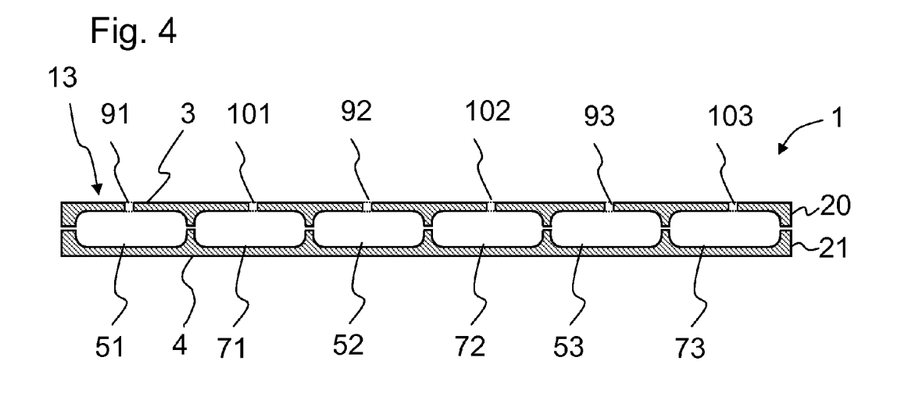
FIG. 4 shows an embodiment of a diaphragm with two assembled half-shells.

FIG. 4 shows another embodiment of a diaphragm 1. This embodiment of the diaphragm comprises two half-shells 20 and 21. The half-shells 20 and 21 are assembled to form a diaphragm, the gas feed and gas discharge chambers being defined between the two half-shells 20, 21. The half-shells 20 and 21 may likewise be produced by extrusion. The half-shells 20 and 21 may nevertheless also be manufactured by molding. In an embodiment of a diaphragm as shown in FIG. 4, the half-shells may also comprise different materials. For example, the lower half-shell 21 may comprise a highly thermally conductive material, so that the temperature equilibration or temperature adaptation of the levitation gas lying in the chambers is accelerated further.

Figure 5:
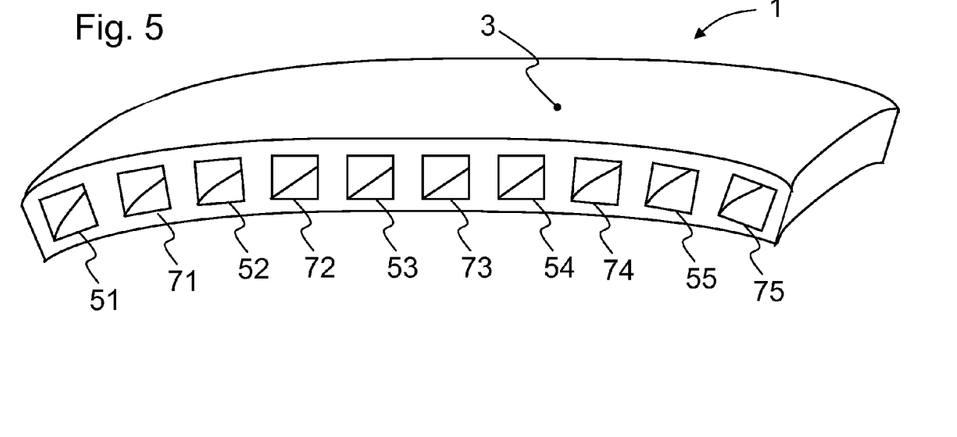
FIG. 5 shows an embodiment of the diaphragm with a curved surface.

Yet another embodiment of the diaphragm is represented in FIG. 5. This embodiment of the diaphragm with chambers 51 to 55 and 71 to 75, of which the chambers 51 to 55 may for example be used as gas feed chambers and the chambers 71 to 75 as gas discharge chambers, furthermore has a curved surface 3. This may, for example, be used for supporting and/or transporting the glass or glass ceramic. In particular, however, curved glasses or glass ceramics may also be produced with such a diaphragm 1.

Figure 6A:
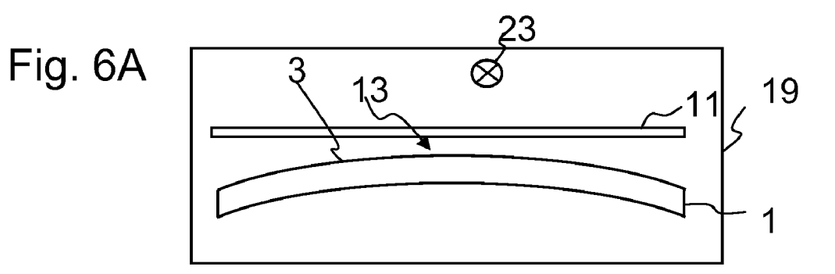
FIGS. 6A and 6B show with the aid of schematic cross-sectional views of one embodiment and, FIGS. 6C and 6D show with the aid of schematic cross-sectional views of another embodiment of a device according to the invention, the method steps for producing a curved glass ceramic article.
Figure 6B:
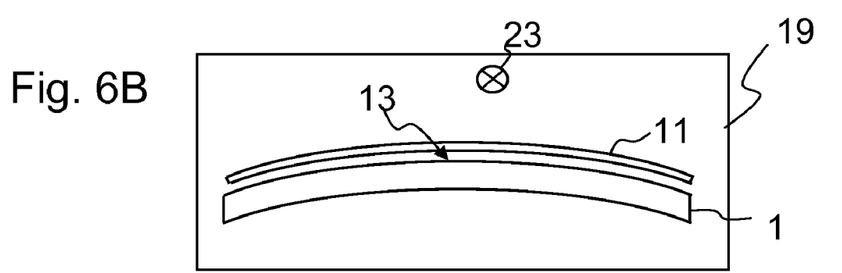
Figure 6C:
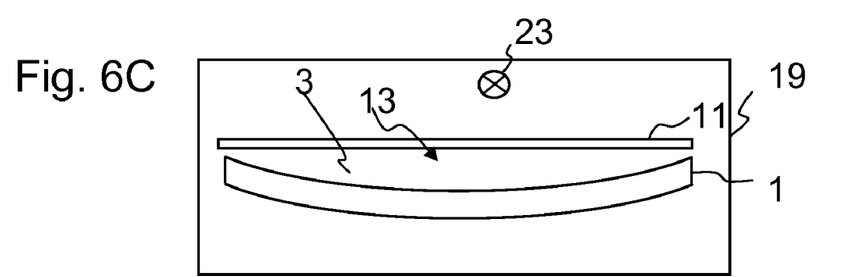

Method steps for producing such curved glasses or glass ceramics are represented by way of example with the aid of cross-sectional views of an embodiment of a device according to the invention, denoted overall by 19, in FIGS. 6A and 6B as well as 6C and 6D.

The device 19 according to the invention shown in FIGS. 6A to 6D is configured as an oven, in particular as a ceramizing open for producing glass ceramic articles.

First, a plate-shaped initial glass 11 is shaped in the conventional way by molding. It is subsequently put into the device 19 with a diaphragm 1 arranged therein, so that the initial glass lies above the bearing surface 3, as represented in FIG. 3A or 3C. The diaphragm 1 has a curved surface 3, like the embodiment represented in FIG. 5. This is represented as being convexly curved by way of example in FIGS. 3A and 3B. Concave curvature like that of the diaphragm 1 of the embodiment of the invention represented in FIGS. 6C and 6D, or a combination of convexly and concavely curved regions, for example as in a corrugated surface, is however likewise possible.

In order to keep the initial glass info patient above the diaphragm 1, and thus avoid contact, a gas cushion 13 between the support and the initial glass 11 is generated by gas supply via gas feed chambers arranged in the diaphragm. Advantageously, the initial glass may also be laterally held or guided, in order to prevent it from drifting away.

Figure 6D:
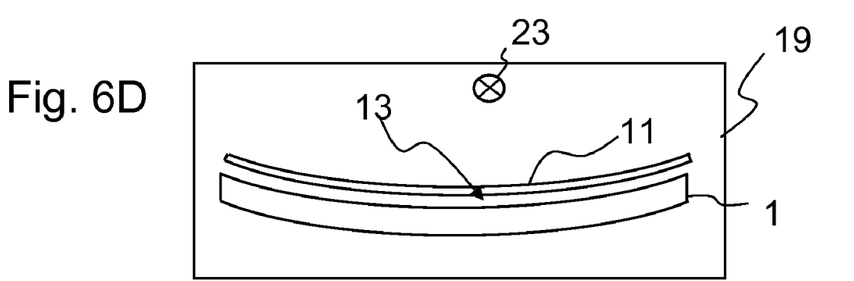

Subsequently, by means of an electrical heating device 23 arranged in the device 19, the initial glass is heated until it softens. Owing to the force of gravity acting on the initial glass, it likewise becomes curved, the regions of the initial glass lying further away from the bearing surface 3 of the diaphragm 1 sinking until an essentially homogeneous pressed distribution is produced by the gas cushion 13. Equalization and homogenization of the pressure distribution is in this case achieved, as described above, by gas-conducting connections to gas discharge chambers arranged in the diaphragm. This situation is shown by FIGS. 6B and 6D, respectively. The ceramization on the support 1 may be incorporated with the coating process or carried out subsequently.

Figure 7:
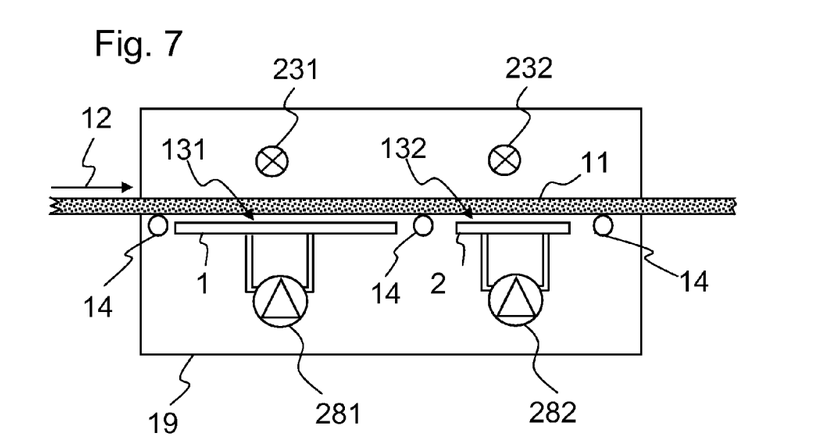
FIG. 7 shows an embodiment of a device according to the invention for continuously ceramizing a glass web.

FIG. 7 represents an embodiment of a device according to the invention for continuously ceramizing a glass web. This embodiment of a device 19 according to the invention accordingly comprises a ceramizing oven configured as a tube oven. In order to ceramize a continuous glass web 11, two diaphragms 1 and 2, which are supplied by gas recirculation devices 281 and 282, are arranged in the device 19. These may respectively be connected to the diaphragm via gas distribution chambers, as was represented with the aid of FIG. 1C.

The continuous glass web is transported through the device 19 and, in the sections of the transport path in the region of the diaphragms, it rests on the gas cushions 131 and 132 generated by these. Rolling bearings 14, on which the glass web rests, are additionally provided in the device in order to support the web further.

The diaphragms 1 and 2 are assigned heating devices 231 and 232, in order to heat the glass web in these sections. In particular, the glass web may be heated to respectively different temperatures by the heating devices 231 and 232.

The diaphragms are of different length, so that the material of the glass web is subjected to a chronological temperature profile by being transported at a particular transport rate. For instance the glass, being levitated on the diaphragm 1, may first be heated to a temperature T1 in a range of from 650 to 800° C. and then kept at this temperature for a period of from 0.5 to 4 hours in order to form crystallization seeds in the glass. The glass may then be heated further to a temperature T2 in a range of from 850 to 950° C. and kept at this temperature T2 for a period of about 5 to 50 minutes, while the glass is levitationally transported on the diaphragm 2. In this phase, the glass web is thoroughly crystallized. The ceramized glass web is subsequently cooled back to room temperature and leaves the device as a glass ceramic. During the ceramization, the temperature of the levitation cushion is kept with a temperature gradient of less than 10° C., preferably less than 5° C., in the direction along the bearing surface. Particularly uniform ceramization is achieved by this uniform temperature distribution. Surprisingly, this also has the effect of a significantly increased strength for the glass ceramic articles produced in this way.

It is apparent to the person skilled in the art that the invention is not restricted to the exemplary embodiments described above, but may be modified in a variety of ways. In particular, the features of the individual exemplary embodiments may also be combined with one another.

The invention claimed is:

1. A device (19) for transporting and supporting glass ceramic or glass, which comprises at least one diaphragm (1, 2) that has at least one continuous bearing surface (3) and at least one gas feed chamber (51-55) and at least one gas discharge chamber (71-75), the gas feed chamber (51-55) and the gas discharge chamber (71-75) having a gas-permeable connection to the bearing surface (3), wherein the gas feed chamber has at least one gas permeable connection on the lower side in order to feed gas into the feed chamber and having at least one rolling bearing (14) for supporting the glass ceramic or the glass, wherein the rolling bearing (14) is gas-supported.

2. The device as claimed in claim 1, wherein the rolling bearing (14) is sunk into the bearing surface (3).

3. The device as claimed in claim 1, wherein the rolling bearing (14) protrudes out of the bearing surface (3) by at most half the floating height of the glass or glass ceramic (11).

* * * * *